(12) United States Patent
Lee et al.

(10) Patent No.: US 12,111,819 B1
(45) Date of Patent: Oct. 8, 2024

(54) SAMPLING SPACE-SAVING SET SKETCHES

(71) Applicant: DataDog Inc., New York City, NY (US)

(72) Inventors: Homin K. Lee, Brooklyn, NY (US); Charles-Philippe Masson, Paris (FR)

(73) Assignee: DataDog Inc., New York City, NY (US)

( * ) Notice: Subject to any disclaimer, the term of this patent is extended or adjusted under 35 U.S.C. 154(b) by 0 days.

(21) Appl. No.: 18/239,810

(22) Filed: Aug. 30, 2023

(51) Int. Cl.
*G06F 16/00* (2019.01)
*G06F 16/23* (2019.01)
*G06F 16/535* (2019.01)
*G06F 16/58* (2019.01)

(52) U.S. Cl.
CPC ........ *G06F 16/2365* (2019.01); *G06F 16/535* (2019.01); *G06F 16/5866* (2019.01)

(58) Field of Classification Search
CPC . G06F 16/2365; G06F 16/535; G06F 16/5866
See application file for complete search history.

(56) References Cited

U.S. PATENT DOCUMENTS

| | | | | |
|---|---|---|---|---|
| 2013/0103711 A1* | 4/2013 | Woodruff | ................ | G06F 16/00 707/769 |
| 2018/0239792 A1* | 8/2018 | Ting | ........................ | G06N 7/01 |
| 2019/0318042 A1* | 10/2019 | Paul | ........................ | G06F 17/18 |
| 2019/0384830 A1* | 12/2019 | Nazi | ........................ | G06F 17/18 |
| 2021/0056586 A1* | 2/2021 | Bao | ..................... | G06Q 30/0205 |
| 2021/0216517 A1* | 7/2021 | Graefe | ................ | G06F 16/2272 |
| 2022/0091873 A1* | 3/2022 | Skvortsov | ........... | G06F 9/45558 |

FOREIGN PATENT DOCUMENTS

WO WO-2021076775 A1 * 4/2021 ........... G06F 16/144

OTHER PUBLICATIONS

CAIDA. 2004. The CAIDA UCSD Dataset on the Witty Worm—Mar. 19-24, 2004. CAIDA UCSD.

Agarwal, Pankaj K., et al., "Mergeable Summaries", In Proceedings of the 31st ACM SIGMOD-SIGACT-SIGAI Symposium on Principles of Database Systems (Scottsdale, Arizona, USA) (Pods 12). ACM, New York, NY, USA, 23-34. https://doi.org/10.1145/2213556.2213562. May 2012.

(Continued)

Primary Examiner — Syed H Hasan
(74) Attorney, Agent, or Firm — Botos Churchill IP Law

(57) ABSTRACT

The technology involves sampling space-saving set sketches, which relates to tracking and evaluating information associated with large data sets. This can include a number of distributed data streams or other data sets that may come from different sources such as Internet traffic. The sets each have corresponding labels and distinct items. One approach includes performing a query for each distributed data set to determine whether a given label associated with that distributed data set is in a corresponding sketch. When that label is in the corresponding sketch, the distinct item associated with that label is inserted into the corresponding sketch. When the label is not in the corresponding sketch, then depending on whether a number of labels in the sketch is less than a specified size, the approach may add the label to a particular sketch and/or insert the distinct item into the particular sketch according to certain defined criteria.

23 Claims, 13 Drawing Sheets

(56) References Cited

OTHER PUBLICATIONS

Bar-Yossef, Ziv, et al., "Counting Distinct Elements in a Data Stream", In Randomization Approximation Techniques, 6th Intl Workshop, RANDOM 2002, Cambridge, MA, Sep. 13-15, 2002, Proc (Lecture Notes in Comp Scn, vol. 2483),J D P. Rolim and S P. Vadhan. Springer, Berlin, Germany, 1-10.https://doi.org/10.1007/3-540-45726-7_1.
Blasiok, Jaroslaw, et al., "Optimal Streaming and Tracking Distinct Elements with High Probability", ACM Transactions on Algorithms, vol. 16, No. 1, Article 3. Publication date: Dec. 2019, 28 pgs.
Cao, J., et al., "Identifying High Cardinality Internet Hosts", In IEEE INFOCOM 2009. IEEE, Piscataway, NJ, USA, 810-818. https://doi.org/10.1109/INFCOM.2009.5061990.
Charikar, Moses, et al., "Finding Frequent Items in Data Streams.", In Automata, Languages and Programming, 29th International Colloquium, ICALP 2002, Malaga, Spain, Jul. 8-13, 2002, Proceedings (Lecture Notes in Computer Science, vol. 2380), Springer, Berlin, Germany, 693-703. https://doi.org/10.1007/3-540-45465-9_59.
Cohen, Edith, et al., "WOR and p's: Sketches for Ip-Sampling Without Replacement", In Advances in Neural Information Processing Systems 33: Annual Conference on Neural Information Processing Systems Dec. 6-12, 2020, virtual, https://proceedings.neurips.cc/paper/2020/hash/f1507aba9fc82ffa7cc7373c58f8a613-Abstract.html.
Considine, Jeffrey, et al., Robust approximate aggregation in sensor data management systems. ACM Trans. Database Syst. 34, 1 (2009), 6:1-6:35. https://doi.org/10.1145/1508857.1508863.
Cormode, Graham, et al., "An Improved Data Stream Summary: The Count-Min Sketch and Its Applications.", In LATIN 2004: Theoretical Informatics, 6th Latin American Symposium, Buenos Aires, Argentina, Apr. 5-8, 2004, Proceedings (Lecture Notes in Computer Science, vol. 2976), Martin Farach-Colton (Ed.). Springer, Berlin, Germany, 29-38.
Cormode, Graham, et al., "Methods for Finding Frequent Items in Data Streams", The VLDB Journal 19, 1 (Feb. 2010), 3-20. https:10//doi.org/10.1007/s00778-009-0172-z.
Cormode, Graham, et al., "Space Efficient Mining of Multigraph Streams", In Proceedings of the Twenty-Fourth ACM SIGMOD-SIGACTSIGART Symposium on Principles of Database Systems (Baltimore, Maryland) (PODS 05), 2005. Association for Computing Machinery, New York, NY, USA, 271-282.
Dasgupta, Anirban, et al., "A Framework for Estimating Stream Expression Cardinalities", In 19th International Conference on Database Theory, ICDT 2016, Bordeaux, France, Mar. 15-18, 2016 (LIPIcs, vol. 48), Wim Martens and Thomas Zeume (Eds.). Schloss Dagstuhl—Leibniz-Zentrum für Informatik, Wadern, Germany, 6:1-6:17.https.
Estan, Cristian, et al., "Counting Active Flows on High Speed Links.", In Proceedings of the 3rd ACM SIGCOMM Conference on Internet Measurement (Miami Beach, FL, USA) (IMC 03). Association for Computing Machinery, New York, NY, USA, 153-166. htps://doi.org/10.1145/948205.948225, Oct. 2003.
Feibish, Shir Landau, et al., "Mitigating DNS Random Subdomain DDoS Attacks by Distinct Heavy Hitters Sketches", 2017 in Proceedings of the Fifth ACM/IEEE Workshop on Hot Topics in Web Systems and Technologies (San Jose, CA) (HotWeb 17). Association for Computing Machinery, NY, NY, New York, NY, USA, https://doi.org/10.1145/3132465.3132474.
Flajolet, Philippe, Philippe Flajolet. 1990. On adaptive sampling. Computing 43, 4 (1990), 391-400. https://doi.org/10.1007/BF02241657.
Flajolet, Philippe, et al., 1983. Probabilistic Counting. In 24th Annual Symposium on Foundations of Computer Science, Tucson, Arizona, USA,Nov. 7-9, 1983. IEEE Computer Society, Piscataway, NJ, USA, 76-82. https://doi.org/10.1109/SFCS.1983.46.
Flajolet, Philippe, et al., "HyperLogLog: the analysis of a near-optimal cardinality estimation algorithm.", 2007. In DMTCS Proceedings vol. AH, 2007 Conference on Analysis of Algorithms (AofA 07).DMTCS, Strasbourg, France, 127-146. https://doi.org/10.46298/dmtcs.3545.
Ganguly, Sumit, et al., "Streaming Algorithms for Robust, Real-Time Detection of DDoS Attacks.", 2007. In 27th International Conference on Distributed Computing Systems (ICDCS 07). IEEE Computer Society, Piscataway, NJ, USA, 4-4. https://doi.org/10.1109/ICDCS. 2007.142.
Heule, Stefan, et al., "HyperLogLog in Practice: Algorithmic Engineering of a State of the Art Cardinality Estimation Algorithm", 2013. In Proceedings of the 16th International Conference on Extending Database Technology (Genoa, Italy) (EDBT 13). Association for Computing Machinery, New York, NY, USA, 683-692. https://doi.org/10.1145/2452376.2452456.
Huang, Zengfeng, et al., "Randomized algorithms for tracking distributed count, frequencies, and ranks.", 2012. In Proceedings of the 31st ACM SIGMOD-SIGACT-SIGART Symposium on Principles of Database Systems, PODS 2012, Scottsdale, AZ, USA, 2012, ACMUSA, 295-306. https://doi.org/10.1145/2213556.2213596 Full version at http://arxiv.org/abs/1412.1763ch.
Kamiyama, N., et al., "Simple and Adaptive Identification of Superspreaders by Flow Sampling", In IEEE INFOCOM 2007—26th IEEEInternational Conference on Computer Communications. IEEE, Piscataway, NJ, USA, 2481-2485. https://doi.org/10.1109/INFCOM.2007.305.
Kane, Daniel, et al., "An optimal algorithm for the distinct elements problem", In Proceedings of the Twenty-Ninth ACM SIGMOD-SIGACT-SIGART Symposium on Principles of Database Systems, PODS 2010, Indianapolis, Indiana, USA, Jan Paredaens and Dirk Van Gucht (Eds.). ACM, New York, NY, USA, 41-52. https://doi.org/10.1145/1807085.
Lang, Kevin J., Back to the Future: an Even More Nearly Optimal Cardinality Estimation Algorithm. arXiv:1708.06839 http://arxiv.org/abs/1708.06839, 2017.
Li, Tao, et al., "Spreader Classification Based on Optimal Dynamic Bit Sharing", IEEE/ACM Transactions on Networking 21, 3 (2013), 817-830. https://doi.org/10.1109/TNET.2012.2218255.
Liu, Weijiang, et al., 2016. Detection of Superpoints Using a Vector Bloom Filter. IEEE Transactions on Information Forensics and Security 11, 3 (2016), 514-527. https://doi.org/10.1109/TIFS.2015.2503269.
Liu, Yang, et al., "Identifying High-Cardinality Hosts from Network-Wide Traffic Measurements", 2016. IEEE Transactions on Dependable and Secure Computing 13, 5 (2016), 547-558. https://doi.org/10.1109/TDSC.2015.
Locher, Thomas, "Finding Heavy Distinct Hitters in Data Streams", 2011.Twenty-Third Annual ACM Symposium on Parallelism in Algorithms and Architectures (San Jose, California, USA) (SPAA 11). Association for Computing Machinery, New York, NY, USA, 299-308. htps://doi.org/10.1145/1989493.1989541.
Masson, Charles, et al., "Computing Accurate Percentiles with DDSketch", 2019. https://www.datadoghq.com/blog/engineering/computing-accuratepercentiles-with-ddsketch. Accessed: Jun. 27, 2023.
Masson, Charles, et al., "DDSketch: A fast and fullymergeable quantile sketch with relative-error guarantees", 2019.The VLDB Journal 12, 12 (2019), 2195-2205.
Metwally, Ahmed, et al., "Efficient Computation of Frequent and Top-k Elements in Data Streams", In Database Theory—ICDT 2005, 10th International Conference, Edinburgh, UK, Jan. 5-7, 2005, Proceedings (Lecture Notes in Computer Science, vol. 3363), Thomas Eiter and Leonid Libkin (Eds.). Springer, Berlin, Germany, 398-412. https://doi.org/10.
Metwally, Ahmed, et al., "Why Go Logarithmic If We Can Go Linear? Towards Effective Distinct Counting of Search Traffic", In Proceedings of the 11th International Conference on Extending Database Technology: Advances in Database Technology (Nantes, France) (EDBT 08). Association for Computing Machinery, New York, NY, USA, 618-629. https://doi.org/10.1145/1353343.1353418. Mar. 2008.
Misra, Jayadev, et al., "Finding Repeated Elements", 1982. Sci. Comput.Program. 2, 2 (1982), 143-152. https://doi.org/10.1016/0167-6423(82)90012-0.

(56) References Cited

OTHER PUBLICATIONS

Plonka, Dave, "FlowScan: A Network Traffic Flow Reporting and Visualization Tool", 2000. In Proceedings of the 14th USENIX Conference on System Administration (New Orleans, Louisiana) (LISA 00). USENIX Association, USA, 305-318.

Roesch, Martin, "Snort—Lightweight Intrusion Detection for Networks", 1999. In Proceedings of the 13th USENIX Conference on System Administration (Seattle,Washington) (LISA 99). USENIX Association, USA, 229-238.

Shahout, Rana, et al., "Combining Sketching and Sampling is Better than Either for per-Item Quantile Estimation", 2022. In Proceedings of the 15th ACM International Conference on Systems and Storage (Haifa, Israel) (SYSTOR 22). Association for Computing Machinery, New York, NY, USA, 152. https://doi.org/10.1145/3534056.3535009.

Sidana, Sumit, et al., "KASANDR: A Large-Scale Dataset with Implicit Feedback for Recommendation", 2017. In Proceedings of the 40th International ACM SIGIR Conference on Research and Development in Info Retrieval (Shinjuku, Tokyo, Japan) (SIGIR 17). Assoc for Computing Machinery, New York, NY, USA, 1245-1248. https://doi.org/10.1145/3077136.3080713.

Tang, Lu, et al., "SpreadSketch: Toward Invertible and Network-Wide Detection of Superspreaders", 2020. In IEEE INFOCOM 2020—IEEE Conference on Computer Communications. IEEE, Piscataway, NJ, USA, 1608-1617. https://doi.org/10.1109/INFOCOM41043.2020.9155541.

Ting, Daniel, "Approximate Distinct Counts for Billions of Datasets", In Proceedings of the 2019 International Conf on Management of Data, SIGMOD Conf 2019, Amsterdam, The Netherlands, Jun. 30-Jul. 5, 2019, P A.Boncz, S Manegold, A Ailamaki, A Deshpande, and T Kraska (Eds.). ACM, NY NY, USA, 69-86. https://doi.org/10.

Venkataraman, Shobha, et al., "New streaming algorithms for fast detection of superspreaders", In Proceedings of the Network and Distributed System Security Symposium, NDSS 2005, San Diego,California, USA. The Internet Society, Reston, VA, 1-1.

Wang, Pinghui, et al., "A Data Streaming Method for Monitoring Host Connection Degrees of High-Speed Links", 2011. IEEE Transactions on Information Forensics and Security 6, 3 (2011), 1086-1098. https://doi.org/10.1109/TIFS.2011.2123094.

Weber, Ralf, "Latest Internet Plague: Random Subdomain Attacks", (2014) https://indico.uknof.org.uk/event/31/contributions/349/ UKNOF29 & Internet Society ION Conference.

Xiao, Qingjun, et al., "Hyper-Compact Virtual Estimators for Big Network Data Based on Register Sharing", In Proceedings of the 2015 ACM SIGMETRICS Intl Conf on Measurement and Modeling of Computer Systems, Portland, OR, Jun. 15-19, 2015, Bill Lin,Jun (Jim) Xu, S Sengupta, and D Shah (Eds.). ACM, NY, NY,417-428. https://doi.org/10.1145/2745844.2745870.

Yoon, Myungkeun, et al., "Fit a Compact Spread Estimator in Small High-Speed Memory", IEEE/ACM Trans. Netw. 19, 5 (Oct. 2011), 1253-1264. https://doi.org/10.1109/TNET.2010.2080285.

Yu, Minlan, et al., "Software Defined Traffic Measurement with OpenSketch", 2013. In Proceedings of the 10th USENIX Conference on Networked Systems Design and Implementation (Lombard, IL) (NSDI 13). USENIX Association, USA, 29-42.

Zhao, Qi, et al., "Joint Data Streaming and Sampling Techniques for Detection of Super Sources and Destinations", 2005. In Proceedings of the 5th ACM SIGCOMM Conference on Internet Measurement (Berkeley, CA) (IMC 05). USENIX Association, USA, 7.

\* cited by examiner

FIG. 2

| | Witty | PubMed | KASANDR | Zipf |
|---|---|---|---|---|
| entries | 123,931,016 | 483,450,157 | 15,844,717 | 100,000,000 |
| entries for top 100 | 26% | 12% | 5% | 0.4% |
| entries for top 1000 | 88% | 45% | 14% | 3% |
| unique entries | 99% | 100% | 52% | 100% |
| unique labels | 16,821 | 141,043 | 2,158,859 | 100,000 |
| unique items | 14,962,090 | 8,200,000 | 291,485 | 100,000,000 |
| avg label set size | 7322.6 | 3,427.7 | 3.8 | 1000 |
| p50 label set size | 84 | 191 | 2 | 922 |
| p90 label set size | 6,311 | 3,278 | 7 | 1271 |
| p99 label set size | 195,592 | 66,354 | 33 | 2010 |
| max label set size | 502,142 | 2,323,263 | 4080 | 11,610 |

FIG. 4A

| | SSSS | Count-HLL | Spread |
|---|---|---|---|
| $NAE(Q_{10})$ | 0.02 | 0.05 | 0.81 |
| $NAE(Q_{100})$ | 0.02 | 0.07 | 1.6 |
| $NAE(Q_{1000})$ | 0.04 | 0.59 | 10.0 |
| Memory | 2.2 MiB | 11.7 MiB | 8.6 MiB |

FIG. 4B

| HLL size | 64 | 128 | 256 | 512 | 1024 | 2048 | 4096 |
|---|---|---|---|---|---|---|---|
| SSSS size s | 18289 | 13329 | 8642 | 5073 | 2778 | 1459 | 748 |
| $NAE(Q_{1000})$ | 0.096 | 0.083 | 0.049 | 0.038 | 0.034 | 0.047 | 0.096 |

FIG. 4C

| | SSS | RSSS | SSSS |
|---|---|---|---|
| $NAE(Q_{10})$ | 1.2 | 0.68 | 0.02 |
| $NAE(Q_{100})$ | 4.1 | 2.7 | 0.02 |
| $NAE(Q_{1000})$ | 24.0 | 18.0 | 0.04 |

FIG. 4D

|  | Witty | PubMed | KASANDR | Zipf |
|---|---|---|---|---|
| SSSS | 2970 | 3650 | 1600 | 21100 |
| Count-HLL | 2810 | 3570 | 1480 | 27900 |
| Spread | 2120 | 2470 | 1310 | 19700 |

902 — Initializing, by one or more processors of a computing system, a set of monotonic distinct count sketches associated with a plurality of distributed data sets, the plurality of distributed data sets having corresponding labels and corresponding pluralities of distinct items, in which each sketch in the set is associated with an accuracy parameter, the accuracy parameter indicating an approximation accuracy for that sketch 904 — Performing, for each of the plurality of distributed data sets, a query to determine whether a given label associated with that distributed data set is in a corresponding sketch of the set of sketches 906 — Upon determination that the given label is not in the corresponding sketch, adding the given label to the corresponding sketch 908 — Upon a number of labels in the corresponding sketch exceeding a threshold amount of labels, identify a label having a smallest count and store the offset value for the corresponding sketch in the memory, wherein a size of the corresponding sketch in the memory is independent of an amount of data in the distributed data set 910 — Determining a cardinality in the corresponding sketch indicating an approximate number of distinct items in a particular one of the distributed data sets

FIG. 9B 920

922 — Initializing, by one or more processors of a computing system, a set of monotonic distinct count sketches associated with a plurality of distributed data sets, the plurality of distributed data sets having corresponding labels and corresponding pluralities of distinct items, in which each sketch in the set is associated with an accuracy parameter, the accuracy parameter indicating an approximation accuracy for that sketch 924 — Performing, by the one or more processors for each of the plurality of distributed data sets, a query to determine whether a given label associated with that distributed data set is in a corresponding sketch of the set of sketches, wherein 926 — When the given label is in the corresponding sketch, inserting the distinct item associated with the given label into the corresponding sketch 928 — When the given label is not in the corresponding sketch, then 930 — When a number of labels in the corresponding sketch is less than a specified size, adding the given label along with a new sketch, and inserting the distinct item associated with the given label into the new sketch 932 — When the number of labels in the corresponding sketch is greater than or equal to the specified size, adding the given label and assign it to a selected one of the set of sketches associated with a minimum label size, and inserting the distinct item associated with the given label into the selected sketch

SAMPLING SPACE-SAVING SET SKETCHES

BACKGROUND

Processing and evaluating large data sets can be both resource and time intensive. This may be particularly challenging for multiple data streams which are received and may need to be acted on in real time or near real time, for instance to handle a distributed denial of service (DDOS) attack. It may be crucial to report accurate summary statistics, and various approaches, including sketches, have been employed in the evaluation of such data sets. Some statistics, such as an average, may be straightforward to compute in a distributed system. In contrast, other statistics such as sample quantiles, may require robust sketch techniques. Existing sketch-based approaches may not be capable of providing accurate and useful statistics for certain types of situations, including the heavy distinct hitters problem.

BRIEF SUMMARY

The sampling space-saving set sketch technology relates to tracking and evaluating information associated with large data sets, such as distributed data streams that may come from different sources. These streams, such as Internet traffic, can involve a massive amount of data. By way of example, queries and results associated with a search engine may constitute hundreds of gigabytes (or higher) of data per day. In some situations, it is possible to store such information and evaluate it offline. In other situations, real-time or near real-time analysis (e.g., within a few seconds) may be crucial for taking a specific action.

For instance, in one scenario a website operator may want to know how many distinct users have clicked on a recommendation, or an advertiser may seek to evaluate the ad campaigns seen by the largest number of distinct users. An example 100 of this is shown in FIG. 1A. Here, system 102 may have a number of processors 104 and memory 106, which may be part of a server farm or cloud computing architecture. In one example, system 102 may include a back-end system that may receive, and the memory 106 may store, one or more data sets 108 and/or sketches 110. In another example, system 102 may be a combination of one or more server systems (e.g., back-end systems) and one or more client systems (e.g., a system with a client agent). The client system(s) may store data sets 108 and sketches 110. The server systems may receive the sketches 110 from the client systems but may or may not receive data sets 108 (e.g., server systems may be absent, without, or otherwise free of all data sets 108).

In either example, the data sets 108 can be obtained, via a computer network 112, from a set of users 114 that may perform searches or otherwise request information 116 about products or services. The sketches 110 may be used to identify which items have received the most clicks, whether a particular ad placement results in the most conversions (e.g., sales), or the like. Prompt analysis of the ad campaign, e.g., in real time or near real time, can enable an advertiser to make meaningful adjustments on the fly to enhance conversions or to achieve other desirable metrics.

In other situations, with certain types of web traffic it may be important to know which IP addresses are making a high number of distinct connections within a short period of time, or whether there is a pattern suggesting a DDOS attack. An example 120 of this scenario is shown in FIG. 1B. Here, the data set(s) 108 may include information about source and/or destination IP addresses associated with various entities 122 (e.g., 122a and 122b as shown), which may generate connections 124. In this case, the sketches 110 may be used to identify which entity(ies) 122 are responsible for the top X % of the connections. This identification can enable a website or service provider to take steps to mitigate a DDOS attack.

According to one aspect of the technology, a computing system comprises memory and one or more processors. The memory is configured to store a set of monotonic distinct count sketches associated with a plurality of distributed data sets. The plurality of distributed data sets each have corresponding labels and corresponding pluralities of distinct items. The one or more processors are operatively coupled to the memory. The one or more processors are configured to: initialize the set of sketches, each sketch in the set being associated with an accuracy parameter, the accuracy parameter indicating an approximation accuracy for that sketch, wherein an offset value is maintained for each sketch and perform, for each of the plurality of distributed data sets, a query to determine whether a given label associated with that distributed data set is in a corresponding sketch of the set of sketches. Upon determination that the given label is not in the corresponding sketch, the one or more processors add the given label to the corresponding sketch, and upon a number of labels in the corresponding sketch exceeding a threshold amount of labels, the one or more processors identify a label having a smallest count and store the offset value for the corresponding sketch in the memory, wherein a size of the corresponding sketch in the memory is independent of an amount of data in the distributed data set. The system then determines a cardinality in the corresponding sketch indicating an approximate number of distinct items in a particular one of the distributed data sets.

Each sketch in the set may be associated with a failure parameter that indicates a failure probability for that sketch. The computing system may be configured to receive the distributed data sets from one or more source computing devices. The plurality of distributed data sets may be a plurality of distributed data streams.

In one example, the one or more processors are further configured to remove the label having the smallest count. In another example, the one or more processors are further configured to merge the set of sketches into a merged sketch, and to determine a set of the number of distinct items in the merged sketch having a selected property. Here, the merge may be performed multiple times at a set interval of time.

A memory footprint of each sketch may be independent of an amount of data represented by that sketch. A first portion of the memory may store the monotonic distinct count sketches, and a second portion of the memory may store the offset value for each sketch. Alternatively or additionally, the one or more processors may comprise a set of processors, and each sketch in the set is associated with a respective one of the set of processors.

In one scenario, the computing system is configured to perform a network security evaluation according to the cardinality. In this case, the network security evaluation may identify one or more source IP addresses that exceed a selected number of distinct connections with destination IP addresses within a determined amount of time.

Alternatively or additionally to any of the above, the one or more processors may be further configured to perform a hash operation to determine whether to either remove a particular label from the corresponding sketch or not add the particular label to the corresponding sketch.

In one configuration, the one or more processors include: a group of processors each assigned to one of the sketches in the set and another processor in operative communication with the group of processors. In this case, each processor in the group is configured to transmit its corresponding sketch to the other processor, while the other processor is configured to merge the transmitted sketches together to generate a merged sketch. Here, the other processor may be further configured to perform a network security evaluation according to a cardinality of the merged sketch.

According to a further aspect of the technology, a computing system comprises memory and one or more processors. The memory is configured to store a set of monotonic distinct count sketches associated with a plurality of distributed data sets. The plurality of distributed data sets each have corresponding labels and corresponding pluralities of distinct items. The one or more processors are operatively coupled to the memory and are configured to initialize the set of sketches, where each sketch in the set being associated with an accuracy parameter, the accuracy parameter indicating an approximation accuracy for that sketch. The one or more processors are configured to perform, for each of the plurality of distributed data sets, a query to determine whether a given label associated with that distributed data set is in a corresponding sketch of the set of sketches. Here, when the given label is in the corresponding sketch, then the distinct item associated with the given label is inserted into the corresponding sketch. When the given label is not in the corresponding sketch, then (i) when a number of labels in the corresponding sketch is less than a specified size, add the given label along with a new sketch, and insert the distinct item associated with the given label into the new sketch, or (ii) when the number of labels in the corresponding sketch is greater than or equal to the specified size, add the given label and assign it to a selected one of the set of sketches associated with a minimum label size, and insert the distinct item associated with the given label into the selected sketch.

Upon sampling, the one or more processors may be further configured to perform a hashing operation on the distinct item associated with the given label. The hashing operation may evaluate whether an inverse value of a hash of the distinct item is greater than a determined variable. In response to evaluation that the inverse value of the hash of the distinct item is greater than the determined variable, the one or more processors may be configured to calculate a size of a minimum in the selected sketch, and to set the determined variable to the size of the minimum in the selected sketch. The one or more processors may be configured to add the given label and assign it to the selected sketch, and insert the distinct item associated with the given label into the selected sketch, when the inverse value of the hash of the distinct item is greater than the specified size. Alternatively or additionally to any of the above, an offset value may be maintained for each sketch in the set of sketches, and the offset values are stored in the memory.

According to a further aspect of the technology, a method comprises: initializing, by one or more processors of a computing system, a set of monotonic distinct count sketches associated with a plurality of distributed data sets, the plurality of distributed data sets having corresponding labels and corresponding pluralities of distinct items, in which each sketch in the set is associated with an accuracy parameter, the accuracy parameter indicating an approximation accuracy for that sketch. The method includes performing, by the one or more processors for each of the plurality of distributed data sets, a query to determine whether a given label associated with that distributed data set is in a corresponding sketch of the set of sketches, wherein: when the given label is in the corresponding sketch, inserting the distinct item associated with the given label into the corresponding sketch; and when the given label is not in the corresponding sketch, then: (i) when a number of labels in the corresponding sketch is less than a specified size, adding the given label along with a new sketch, and inserting the distinct item associated with the given label into the new sketch; and (ii) when the number of labels in the corresponding sketch is greater than or equal to the specified size, adding the given label and assign it to a selected one of the set of sketches associated with a minimum label size, and inserting the distinct item associated with the given label into the selected sketch.

According to another aspect of the technology, a non-transitory computer readable recording medium is provided having instructions stored thereon. The instructions, when executed by one or more processors, implement a method comprising: initializing a set of monotonic distinct count sketches associated with a plurality of distributed data sets, the plurality of distributed data sets having corresponding labels and corresponding pluralities of distinct items, in which each sketch in the set is associated with an accuracy parameter, the accuracy parameter indicating an approximation accuracy for that sketch. The method also includes performing, for each of the plurality of distributed data sets, a query to determine whether a given label associated with that distributed data set is in a corresponding sketch of the set of sketches. When the given label is in the corresponding sketch, the method includes inserting the distinct item associated with the given label into the corresponding sketch. When the given label is not in the corresponding sketch, then: (i) when a number of labels in the corresponding sketch is less than a specified size, adding the given label along with a new sketch, and inserting the distinct item associated with the given label into the new sketch; and (ii) when the number of labels in the corresponding sketch is greater than or equal to the specified size, adding the given label and assign it to a selected one of the set of sketches associated with a minimum label size, and inserting the distinct item associated with the given label into the selected sketch.

BRIEF DESCRIPTION OF THE DRAWINGS

FIG. 2 illustrates a table of test data according to aspects of the technology.

FIGS. 4A-D illustrates tables of test results according to aspects of the technology.

FIGS. 9A-B illustrate example methods in accordance with aspects of the technology.

DETAILED DESCRIPTION

Figure 1A:
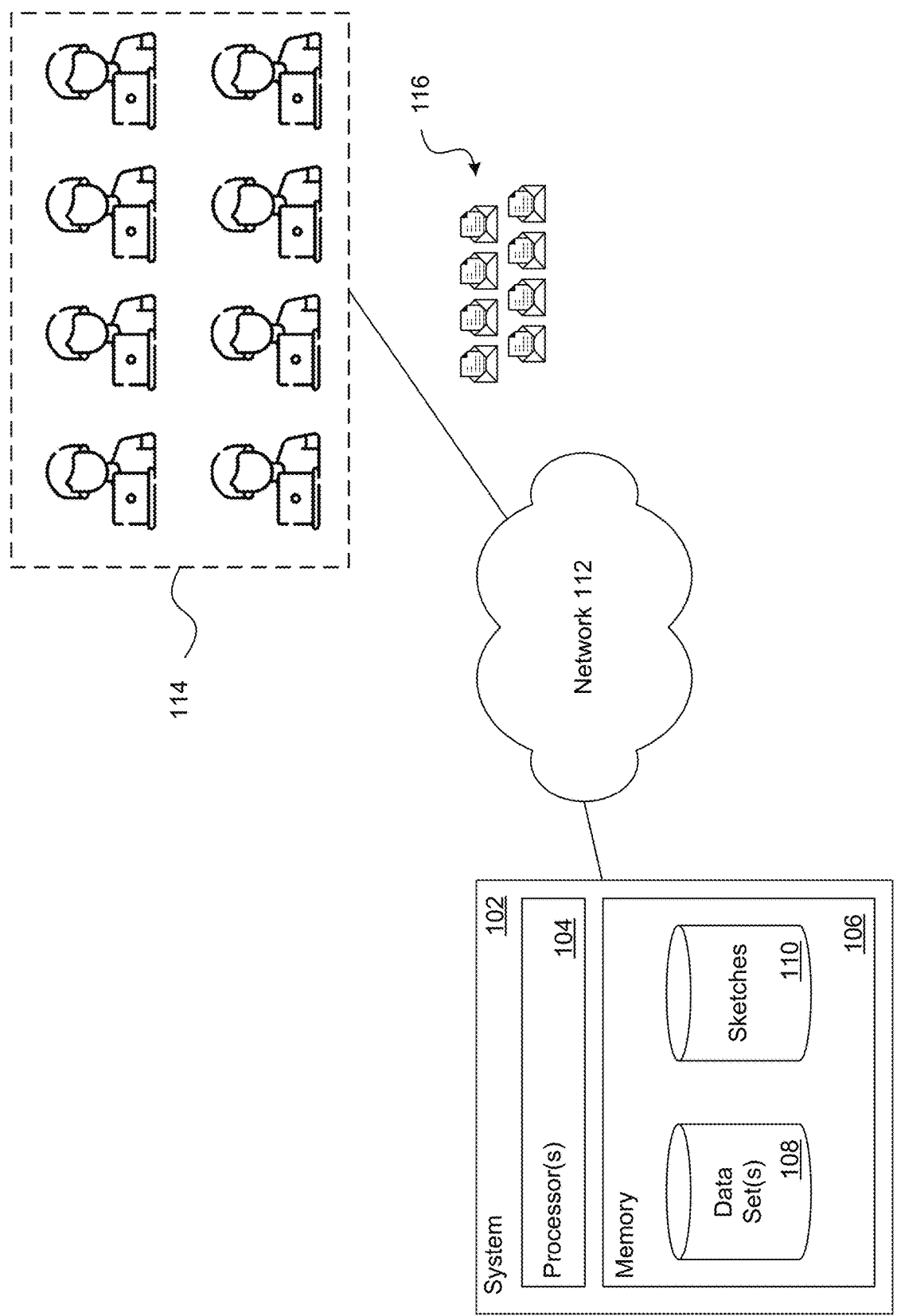
FIGS. 1A-B illustrate example scenarios in accordance with aspects of the technology.
Figure 1B:
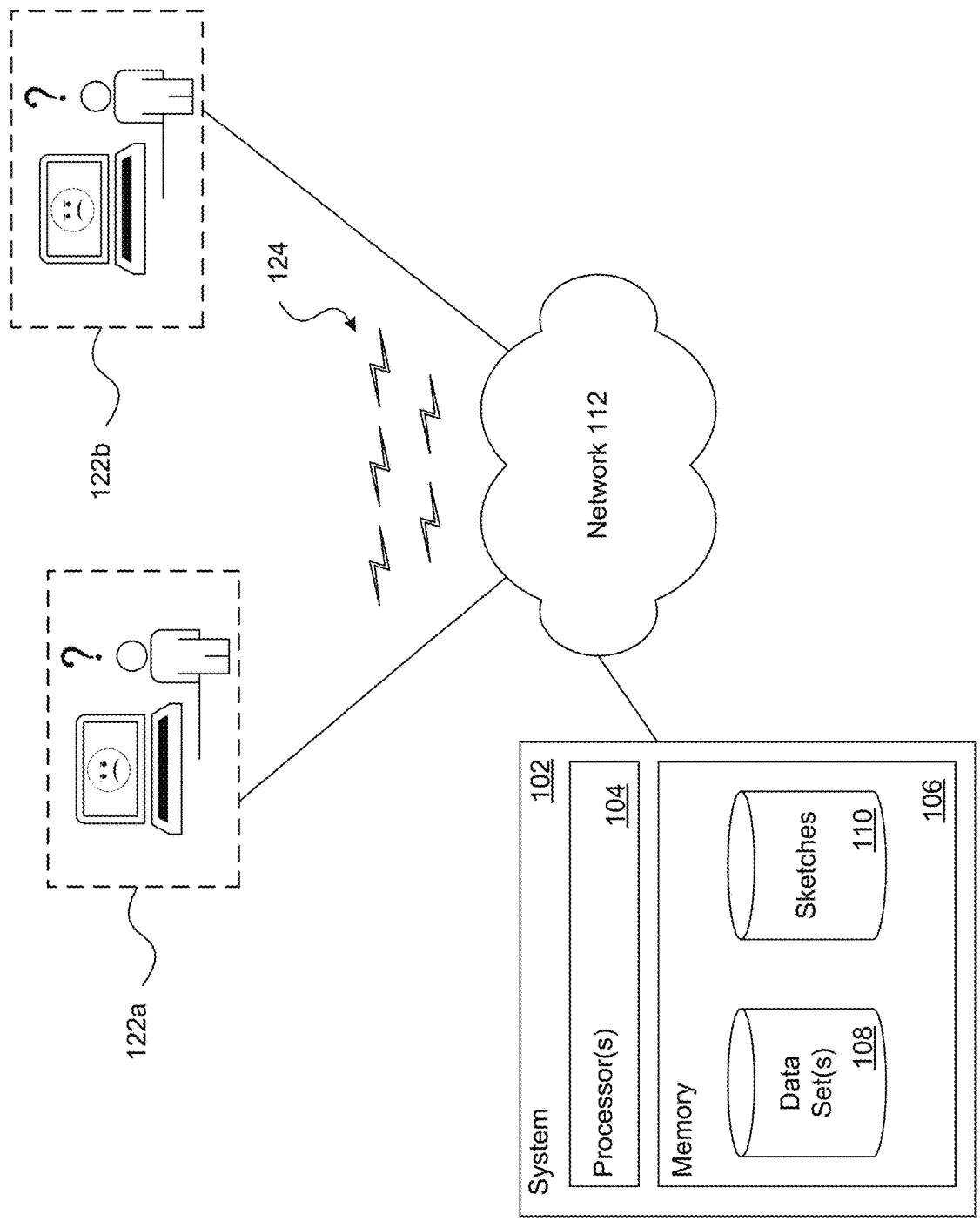

When analyzing distributed data, such as received data streams containing large amounts of Internet traffic, it can be very important to report accurate summary statistics. For instance, given a data stream $x_1, \ldots, x_m$ of elements coming from a universe of size n, let $f_i = |\{k: x_k = i\}|$ be the frequency of element i, so that $\Sigma_i f_i = m$. Depending on what information is contained in the distributed data, it may be important to identify a top X % of users, estimations of the number of distinct items, etc.

Some statistics, such as an average, may be trivial to compute in a distributed system. Others, such as quantiles, can require more sophisticated approaches. One such approach involves sketches. A sketch is a data structure that can approximate a specified query of the data while consuming substantially less space than is required to answer the query without error. For instance, a sketch of a particular set (e.g., a stream) of data x can be a compressed representation of that data. The sketch can represent one or more statistical properties of the data, and may be updated in real time or near real-time.

The sampling space-saving set sketch technology discussed herein is able to effectively address the heavy distinct hitter problem, which combines two types of problems: the distinct count problem and the heavy-hitters problem. The distinct count problem, also known as the set of cardinality problem, is to identify a number of distinct elements (d) seen in a data set such as a received data stream of web traffic. In particular, $d = |\{i: f_i > 0\}|$. In contrast, the heavy hitter problem, with parameter s, is to output all elements with frequency $f_i > m/s$, where m is the number of elements in the stream.

Distinct count algorithms are stochastic approximation algorithms and thus have two parameters: $\in$, the accuracy of the approximation, and $\delta$, which is the probability that the sketch can fail. Distinct count sketches may have the following functions (or equivalently-named functions): 1) NewSketch( ) creates a new instance of the distinct count sketch; 2) Insert(x) inserts an item into the distinct count sketch; and 3) Calling the Distinct( ) function outputs the sketch's approximation of the number of distinct items inserted into the sketch.

The nexus between these two problems can be considered as a "heavy distinct hitters" problem. Here, assume a data stream of elements each with a label, $(\ell_1, x_1), \ldots, (\ell_m, x_m)$, let $f\ell_x = |\{k: \ell_k = \ell, x_k = x\}|$ be the frequency of item x with label $\ell$, and let $d\ell = |\{x: f\ell_x > 0\}|$ be the number of distinct items with label $\ell$. In particular, given a stream or other set of $(\ell, x)$ pairs, find all the labels (that are paired with a large number of distinct items x using only "constant" memory. As used herein, constant memory refers to a size of a corresponding sketch in the memory that is independent of an amount of data in the stream or other set that is processed by the sketch. Moreover, what "large" means regarding the number of distinct items can either be formulated as any set whose cardinality is over some absolute threshold, or it can be defined as the top k sets by cardinality.

The heavy distinct hitters problem can be approached as follows. For parameter s, output all labels with $d\ell > m/s$, and for every label, return an estimate $\tilde{d}\ell$ such that $|\tilde{d}\ell - d\ell| \leq m(1/s + \in)$ with probability at least $1-\delta$, where $d\ell$ is the number of distinct items with label $\ell$, m is the number of elements in the stream, and s is the number of counters. $\in$ refers to the error of the cardinality sketch used by the sampling space-saving set sketch.

The sampling space-saving set sketch approaches described herein apply particular sketching and sampling techniques, and may encompass a number of desired properties. One property is the single pass, in which the sketch performs one look at each element over any corresponding data set.

Another property is accuracy. The sketch approximations should return values that are close to the actual set cardinalities. For instance, consider the normalized absolute error (NAE). For a single set of cardinality $d_i$, let $\tilde{d}_i$ be the sketch approximation, and let $err_i = d_i - \tilde{d}_i$ be the error. The NAE is $\Sigma_i |err_i|/\Sigma_i d_i$, where i is taken over the heavy sets, which includes the top-k cardinality sets.

Yet another property, mentioned above, is constant memory size. While theoretically a system may be able to devote more and more memory to handling large, distributed data streams or other data sets, that may not be feasible in practice where computing devices may have dedicated (and limited) amounts of memory. For instance, a system may process customer logs, but as more and more logs are received by the system, such logs may overload the data structure. While one approach is to discard a certain amount of data if the system is getting close to a memory cap, that may not be the most effective approach when accurate summary statistics are needed from sketches. Thus, according to one aspect of the technology, a memory size is specified and the system is constrained to work within that memory size. In particular, the memory footprint associated with each sketch can be independent of the amount of data processed by that sketch. Thus, the constrained memory size would encompass the total memory footprint for all sketches corresponding to the data sets under evaluation.

A further property is insertion speed. It is highly beneficial for the sketches to be able to process high-throughput data streams without falling behind, so that sketch results can be provided in real time or near-real time.

Yet another property is mergeability. When aggregating over multiple distributed data streams, the system should be able to sketch each data stream separately and then merge the sketches to provide answers over the entire data set without any additional loss of accuracy.

A further property is query speed. While one may have a single sketch processing a data stream in perpetuity, a useful pattern is to sketch the data streams every X seconds, and report statistics as time series. Thus, query speed for the time series can be an important factor for the sketch.

And another property is invertibility. According to one aspect of the technology, each sketch is able to return the labels of all the heavy distinct hitters for its corresponding data set. In contrast, non-invertible sketches are able to return the approximate cardinality for any label provided at query time, but do not store any labels themselves.

Space-Saving Set Sketches

According to one aspect of the technology, a space-saving set sketch (SSSS) approach can be employed that maintains up to s cardinality sketches along with corresponding offset values. Each (cardinality sketch, offset value) pair may be referred to as a counter.

There are a few properties of the minimum value distinct count sketch in this approach, which may be described according to the following lemma. In particular: after m insertions, determine the number of distinct elements $x_i$ with label $\ell$. Let $\alpha := \min_{j \in s} S[j].\text{Distinct}( )$, and let $|\{\ell: d\ell > 0\}| > s$. Then, for Algorithm 1 (presented below):

(1) $\alpha$ never decreases as entries are inserted;
(2) $\alpha \leq (m/s)(1+\in)$;
(3) $\text{Query}(\ell) \leq d\ell(1+\in) + \alpha$; and
(4) If $\ell \notin S$, then $d\ell \leq \alpha/(1-\in)$, where the properties (2)-(4) hold with probability at least $1-\delta_t$, by the strong-tracking property of the count distinct sketch, and $\in$ is its accuracy guarantee.

The first property (1) comes from the use of monotonic distinct count sketches, and the recording of the value of a counter into an offset before deleting it. For the second property (2), note that every one of the m items is inserted into a distinct count sketch exactly once. Thus, the total sum of all the counters is at most $m(1+\epsilon)$ by the strong-tracking sketch guarantee, and the smallest value can be at most $(m/s)$ $(1+\epsilon)$. For the third property (3), each component of the counter can be upper-bounded separately. The distinct count sketch itself has at most $d\ell$ items inserted into it, and it has at most $\epsilon$ relative-error by the sketch guarantee. The offset for any counter is always assigned the value of the minimum counter when that counter is created. By the first property, the minimum value only ever increases until it reaches $\alpha$. For the final property (4), consider the final time the counter for $\ell$ gets removed from S, which may be an associative array of strong-tracking, monotonic distinct count sketches. At the time of removal, its value, which can be referred to as $\alpha'$, is the minimum among all the counters. Then $\alpha'$ can be bound by: $\alpha \geq \alpha' \geq d\ell(1-\epsilon)$. Here, the upper-bound comes from the first property, and the lower-bound comes from the sketch guarantee.

In view of this, Algorithm 1 presents a general space-saving sketches approach, which may be executed by one or more processors algorithmically as follows.

Algorithm 1:
  Initialize (s):
    S←empty associative array of strong-tracking, monotonic distinct count sketches with New Sketch, Insert, Distinct functions, accuracy parameter E and failure parameter δt;
    O←empty associative array of offset values;
  Function Query($\ell$):
    if $\ell \in S$ then return S [$\ell$].Distinct( )+O[$\ell$];
    else return min j∈ S S [j].Distinct( )
  Function Remove($\ell$):
    S.Remove($\ell$);
    O.Remove($\ell$);
  Function Insert($\ell$, x):
    if $\ell \notin S$; then
      S.Add($\ell$, New Sketch( ));
    else
      /* save the smallest counter value to the new label offset */
      y←arg min$_{j \in s}$ Query(j);
      O[$\ell$]←Query(y);
      Remove(y);
      S.Add($\ell$, NewSketch( ));
    S[$\ell$].Insert(x);

By way of example, in this approach first specify a size (e.g., 1000) and never use more than this memory-wise. Second, if the memory is not filled up, every time a new label comes in, it is added to the cardinality sketch. If the memory is full and there is a new label to handle, pick the label with smallest size (cardinality sketch) and record that (e.g., a size of 50). Then add the offset to the cardinality sketch (in this example, the next time it is queried there will be 51 elements). Note that a is defined to be the size of the minimize-size count distinct sketch currently in the space-saving set sketches. The four properties outlined in the lemma above are about various bounds that can be put on the size of α.

In view of this, the following theorem is provided. For any label $\ell$, let $d\ell$ be the number of distinct elements $x_i$ with label $\ell$ in the stream (or other set). After m insertions to Algorithm 1 with parameter s>4, and $\epsilon < \frac{1}{2}$, $|Query(\ell)-d\ell| \leq m(1/s+(1+1/s)\epsilon)$, with probability at least 1−δt. The following is a proof of the theorem.

If $\ell \notin S$, by properties 2 and 4 from the above lemma, the error is at most:

$$|\alpha - d_\ell| \leq \max(\alpha, d_\ell) \leq \frac{\alpha}{1-\epsilon} \leq \left(\frac{m}{s}\right)\left(\frac{1+\epsilon}{1-\epsilon}\right) = \left(\frac{m}{s}\right)\left(1 + \frac{2\epsilon}{1-\epsilon}\right) \leq \left(\frac{m}{s}\right) + m\epsilon$$

where the last inequality holds as $s>2/(1-\epsilon)$.

If $\ell \in S$, then by properties 2 and 3 from the lemma, the error is at most:

$$d_\ell \epsilon + \alpha \leq d_\ell \epsilon + \left(\frac{m}{s}\right)(1+\epsilon) \leq \left(\frac{m}{s}\right) + \left(1 + \frac{1}{s}\right)m\epsilon$$

where the last inequality comes from bounding $d\ell \leq m$.

Several constraints on the theorem include the following. If the stream of elements ($\ell$, $x_i$) only ever includes one label, then only one counter is created. If each $x_i$ is unique, then all the error comes from the distinct count sketch, and so there would be an upper-bound of me on the error. If the stream of elements ($\ell_j$, $x_i$) only has a single element x, but the $\ell_j$'s cycle through the same s+1 labels repeatedly, then every insert after the first s will delete an existing counter. If the deletions happen sequentially, then after m inserts, every counter will have offsets of m/s. So instead of reporting the correct count dj=1, the sketch can return values as large as (m/s) (1+$\epsilon$). Note that the insertion time may be dominated by the time to find the minimum cardinality label.

Sampling Space-Saving Set Sketches

One refinement of the technology is presented in Algorithm 2 (see below), in which the counter is reused. This may be understood as a recycling variant of Algorithm 1.

Algorithm 2:
  Function Insert($\ell$, x):
    if $\ell \notin S$; then
      if |S|<s; then
        S.Add($\ell$, NewSketch( ));
      else
        /* use the smallest counter as the counter for the new label */
        y←arg min$_{j \in s}$ S[j].Distinct( );
        S.Add($\ell$, S[y]);
        S.Remove(y);
    S[$\ell$].Insert(x);

Here, instead of recording the value of the minimum counter into an offset, the counter that would be removed is reused. While only the Insert function is shown above, the other functions in this scenario would be modified to remove the unused offset values.

Another refinement addressees the issue when there are many labels associated with small sets. Algorithm 3 performs sampling of space-saving sets as follows:

---

Algorithm 3:

Function Insert($\ell$, x):
  if $\ell \in S$; then
    S[$\ell$].Insert(x);
  else
    if |S| < s; then
      S.Add($\ell$, NewSketch( ));
      S[$\ell$].Insert(x);
    else
      y ← arg min$_{j \in s}$ S[j].Distinct( );
      $s_y$ ← S [y].Distinct( );

-continued

Algorithm 3:

```
if 1/h(x) > s_y; then
    S.Add(ℓ, S[y]);
    S.Remove(y);
S[ℓ].Insert(x);
```

In particular, the approach from Algorithm 2 is modified to sample the input. Every time a new entry comes in, it is hashed. If it is below a certain threshold, then the threshold gets lower. For an input (ℓ, x) 1/h(x) is used as an estimate for de (the number of distinct items with label ℓ), where h is a hash function that uniformly maps to the open unit interval U (0, 1). For any item x and $\alpha > 1$, $\Pr[1/h(x) < \alpha] = 1 - 1/\alpha$. Thus, for labels corresponding to small sets the chances of getting into the sketch shrink as the size of the minimum distinct count sketch starts to grow.

The following is a lemma for Algorithm 3 that is analogous to the lemma above for Algorithm 1. After m insertions, let dℓ be the number of distinct elements $x_i$ with label ℓ. Let $\alpha := \min_{j \in S} S[j].\text{Distinct}()$, and let $|\{\ell : d\ell > 0\}| > s$. Then for Algorithm 3:

(1) α never decreases as entries are inserted;
(2) $\alpha \leq (m/s)(1+\epsilon)$;
(3) Query(ℓ) $\leq$ dℓ $(1+\epsilon) + \alpha$; and
(4) If ℓ ∉ S, then dℓ $\leq \alpha \ln(1/\delta_r)$.

The second and third properties hold with probability at least $1-\delta t$ by the strong-tracking property of the count distinct sketch with accuracy guarantee $\epsilon$, while the fourth holds with probability at least $1-\delta_t-\delta_r$, for $\delta_r > 0$.

The proofs of the first three properties remain unchanged from the proofs for the original lemma. For the last property, consider the final time the counter for ℓ gets removed from S. At the time of removal, its value is the minimum among all the counters, and it can be upper-bounded by α. A concern may be with the number of items for ℓ that are sampled away after the sketch stops updating. If there are r such remaining items, then the probability that they never enter the sketch is at most $(1-1/\alpha)^r < e^{-r/\alpha} = \delta_r$ for $r = \alpha \ln(1/\delta_r)$.

In view of this, the following theorem is provided: For any label ℓ, let dℓ be the number of distinct elements $x_i$ with label ℓ in the stream. After m insertions, to Algorithm 3 with parameter s:

$$|\text{Query}(\ell) - d_\ell| \leq \left(\frac{m}{s}\right)(1+\epsilon) + m \max\left(\frac{\left(\ln\left(\frac{1}{\delta_r}\right) - 1\right)(1+\epsilon)}{s}, \epsilon\right)$$

with probability at least $1-\delta_t-\delta_r$ for $\delta_t, \delta_r > 0$.

A proof of this theorem is as follows. If ℓ ∉ S, by properties 2 and 4 from the lemma for Algorithm 3, the error is at most:

$$|\alpha - d_\ell| \leq \max(\alpha, d_\ell) \leq \alpha \ln(1/\delta_r) \leq \left(\frac{m}{s}\right)(1+\epsilon)\ln(1/\delta_r) =$$

$$\left(\frac{m}{s}\right)(1+\epsilon) + m\left(\frac{(\ln(1/\delta_r) - 1)(1+\epsilon)}{s}\right)$$

If ℓ ∈ S, by properties 2 and 3 from the lemma for Algorithm 3, then the error is at most dℓ $\epsilon + \alpha \leq$ dℓ $\epsilon + (m/s)(1+\epsilon) \leq m\epsilon + (m/s)(1+\epsilon)$, where the last inequality comes from bounding dℓ $\leq$ m.

Another variation of the sketch-based approach is shown in Algorithm 4, where instead of calculating the minimum size counter at every step, the process implemented by the one or more processors only calculates the value when an item is sampled.

Algorithm 4:

```
Initialize (s):
    S ← empty associative array of strong-
        tracking, monotonic distinct count
        sketches with NewSketch, Insert,
        Distinct methods;
    θ ← 0.0;
Function Query(ℓ):
    if ℓ ∈ S then return S[ℓ].Distinct( );
    else return min_{j∈S} S[j].Distinct( )
Function Insert(ℓ, x):
    if ℓ ∈ S; then S[ℓ].Insert(x);
    else
        if |S| < s; then
            S.Add(ℓ, NewSketch( ));
            S[ℓ].Insert(x);
        else
            if 1/h(x) > θ; then
                y ← arg min_{j∈S} S[j].Distinct( );
                s_y ← S[y].Distinct( );
                θ = s_y;
                if 1/h(x) > s_y; then
                    S.Add(ℓ, S[y]);
                    S.Remove(y);
                    S[ℓ].Insert(x);
```

Algorithm 4 caches the size of the minimum counter into θ, so that the system does not need to recalculate the size of the minimum counter on every insert. Note that the caching does not affect the construction of the sketch at all, and thus the outputs of Algorithms 3 and 4 are equivalent.

All the algorithms 1-4, which address the heavy distinct hitters problem, are described to use any count distinct sketch algorithm, and being sketch algorithms, they will not calculate exact cardinalities. The refinement in Algorithm 4 is to reduce the number of minimum calculations. By way of example, HyperLogLog may be employed so that instead of calculating every single time, the value is cached. See, e.g., "HyperLogLog: the analysis of a near-optimal cardinality estimation algorithm", by Flajolet et al, in DMTCS Proceedings vol. AH, 2007 Conference on Analysis of Algorithms, which is incorporated herein by reference.

HyperLogLog is an algorithm for the count-distinct problem, approximating the number of distinct elements in a multiset. In particular, for this refinement, instead of using an arbitrary cardinality sketch, the system could use HyperLogLog. Then, instead of calculating the minimum size counter at every step, the value would only be calculated when an item is sampled. Note that any other cardinality sketch besides HyperLogLog could be used. Also note that in Algorithm 4, θ is the threshold used to determine when to sample. It may be dynamic or selectable, and may initially be set at 0.

Additionally, the system may apply the method for merging sketches laid out in Algorithm 5, which can be used with any of the above-described approaches including those in Algorithms 1-4. Merging enables the system to process the sketches corresponding to each data set and provide global results in a computation resource and time-efficient manner. Algorithm 5:

```
Function Merge(other):
    if θ<other.θ then θ←other.θ;
    for ℓ ∈ other.S do
```

```
if ℓ ∈ S then S[ ℓ ].Merge(other.S[ ℓ ]);
    else S.Add( ℓ , other.S[ ℓ ]);
/* sort by cardinality and take top s */
SortByValueDescending(S);
while |S|>s do S.Pop( )
```

For the Merge function, the system is configured to take one sketch and merge it with another. This is done by taking the union of their labels and merge their corresponding count distinct sketches. Since there can be as many 2s count distinct sketches after this procedure, the system may sort the merged sketch and remove (via Pop( )) the smallest ones until the sketch is back down to size s.

Testing

The sampling space-saving sets sketches approach from Algorithm 4 was evaluated on several real-world data sets. As the testing was run over multiple data sets with very different characteristics, the error metrics were normalized so that a perfect sketch has an error of 0.0 and 1.0 corresponds to reporting 0 as the estimate for every set cardinality. Errors higher than 1.0 indicate that the sketch is doing worse than the all-zero estimator. Similarly, as the different data sets have very different distributions, instead of specifying a "heavy" set using an arbitrary threshold relative to a characteristic of the data set itself, the errors are reported over the top k for k=10, 100, 1000. Note that considering the top k is related to a threshold of m/k (as there can be at most k sets with cardinality m/k). In other words, if one were to measure sets that take over 1% of the stream, then the approach would want to consider the top 100.

Sketches were compared when they had the same memory constraints. The memory used by each sketch was constrained by setting its parameters to be as large as possible while remaining under the memory limit. The error metrics are shown over the top 10, 100, 1000 sets. The actual top k sets are notated as $T_k$, and the top k according to the sketch as $S_k$.

The precise error metrics are based on Normalized Absolute Error (NAE):

$$NAE(S) = \sum_{i \in S} |d_i - \hat{d}_i| / \sum_{i \in s} d_i$$

where S is either $T_k$ or $S_k$.

When combining precision and recall metrics, the F1-score, the harmonic mean, of precision and recall may be used. The harmonic mean emphasizes the lower of the two numbers, which corresponds with higher values being better for precision and recall. Here, the error metrics were bounded below by 0.0 and unbounded above, with higher error being worse. Thus, to combine the errors over the actual heavy sets and the sketch's heavy sets, the quadratic mean ($\sqrt{(a^2+b^2)/2}$) was used, which emphasizes the larger of the two numbers.

$$Q_k := \sqrt{(NAE(S_k)^2) + NAE(T_k)^2/2}$$

For the testing, sampling space-saving sets sketches were compared with SpreadSketch and Count-HLL. The SpreadSketch approach is described in "SpreadSketch: Toward Invertible and Network-Wide Detection of Superspreaders" by Tang et al, in IEEE INFOCOM 2020—IEEE Conference on Computer Communications. IEEE, Piscataway, NJ, USA, 1608-1617. Count-HLL is described in "Approximate Distinct Counts for Billions of Datasets" by Daniel Ting, in Proceedings of the 2019 International Conference on Management of Data, SIGMOD Conference 2019, Amsterdam, The Netherlands, Jun. 30-Jul. 5, 2019. Both articles are incorporated herein by reference. Note that SpreadSketch is invertible, while Count-HLL is not.

SpreadSketch provides a d by w array of distinct count sketches. It has 3 parameters: the depth (which is set to 4 in their experiments), the width (which varies to match the memory limit), and the number of registers used by the distinct count sketch (which was set to 438). The experiments showed that SpreadSketch benefits greatly from having as large a width as possible, so testing used an even lower size for the distinct count sketch of 64, and only varied the width.

Count-HLL also has depth and width parameters. For testing, d was set to 512, and the width was varied. As this approach is not invertible, it was augmented by the technique used by SpreadSketch which keeps d·w labels. Thus, when a particular cell is updated, the label is updated if a rough estimate of the cardinality of that label is greater than the rough estimate previously recorded for the label corresponding to that cell. When asked for the heavy distinct hitters, the sketch estimates cardinalities for all the labels it knows about, and outputs the highest ones.

The sampling space-saving sets sketch approach is straightforward to tune, as the number of labels kept by the sketch is the same as the number of distinct count sketches in the sketch. In contrast, SpreadSketch and Count-HLL are more difficult to tune as a large part of their memory budget is spent on holding an array of labels whose dimensions changes along with the parameters being tuned for accuracy.

The testing considered the performance of the three algorithms on three real datasets and one synthetic data set. The first two real datasets are from the UCI Machine Learning Repository. This includes the KASANDR dataset (see "KASANDR: A Large-Scale Dataset with Implicit Feedback for Recommendation" by Sidana et al, in Proceedings of the 40th International ACM SIGIR Conference on Research and Development in Information Retrieval (Shinjuku, Tokyo, Japan) (SIGIR '17) pp 1245-1248). This is an ad impression dataset where the labels are ad offer ids and the items are user ids. The task is to find the offers that were shown to the most unique users. The Bag of Words PubMed abstracts dataset is a set of documents. The labels here are the words, the items are the documents, and the task is to find the words appearing in the most documents. The final real data set is the CAIDA UCSD Witty Worm dataset (see the Center for Applied Internet Data Analysis (CAIDA) UCSD Dataset on the Witty Worm—Mar. 19-24, 2004), where the testing used the first four hours of network trace data. The labels here are the source IPs and the items are the destination IPs. The task was to identify the high-cardinality sources.

The synthetic data set was created to be a particularly difficult case for heavy distinct hitter sketches. It has labels drawn according to the Zipf (N; s) distribution for $N=10^8$ and s=0.2, and items are randomly chosen. The exponent parameter s was selected to be much less than 1.0 so that the tail fell very gradually.

FIG. 2 shows a first table with the basic, descriptive statistics for each of the four data sets. An entry is a single (possibly non-unique) label-item pair in the data stream. It can be seen that the KASANDR data set is an order of magnitude smaller than the others, but it has an order of magnitude more labels than the PubMed data set, which in turn has an order of magnitude more labels than the Witty data set. All three real data sets have set size distributions that tail off sharply. To contrast with the real data sets, the parameters of the Zipf data set were set so that the tail is much fatter, and the average and median set sizes are within a factor of 11 of the maximum-size set.

Figure 3:
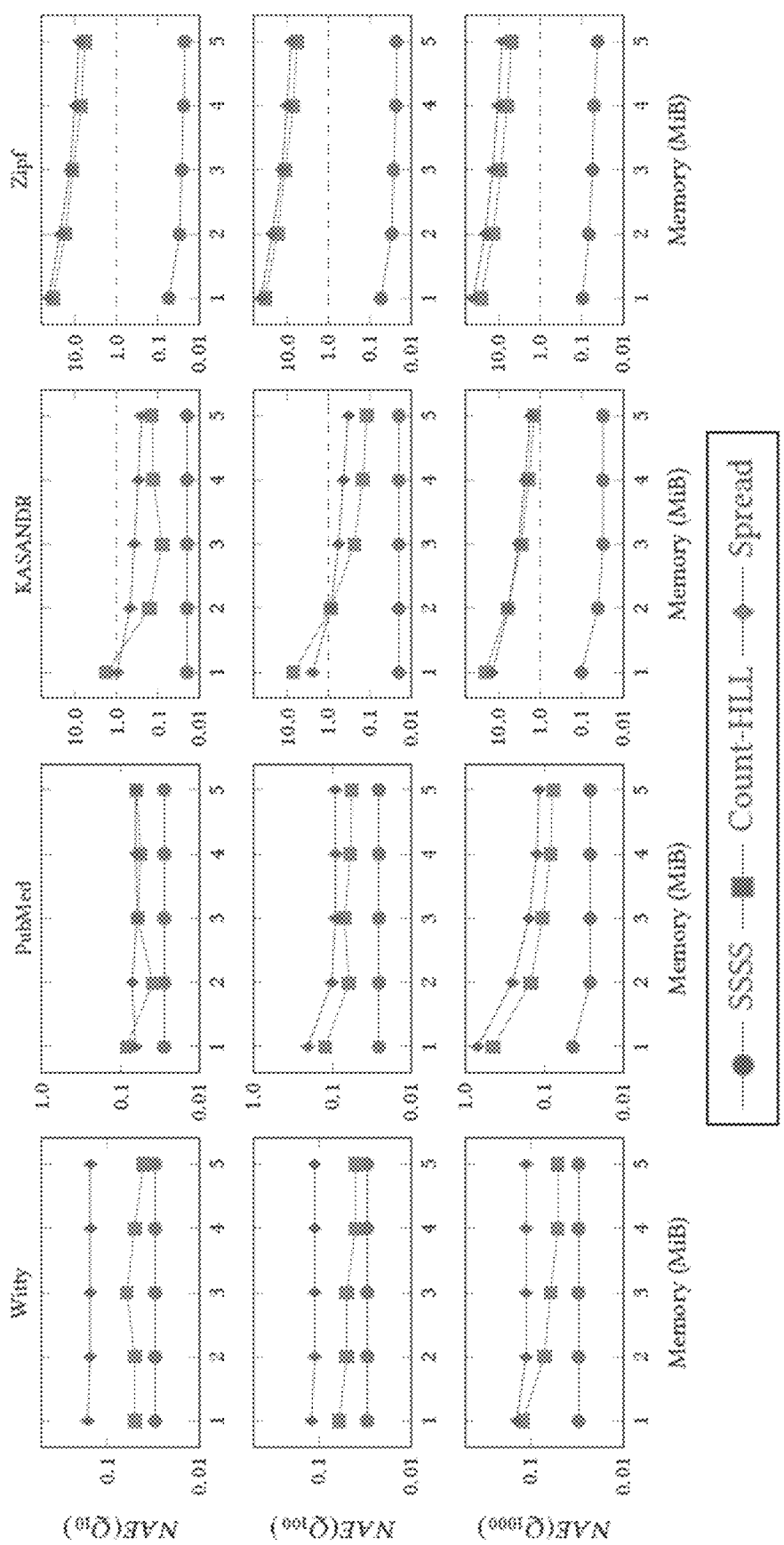
FIG. 3 illustrates plots of test results comparing accuracy versus size according to aspects of the technology.

FIG. 3 presents sets of results comparing accuracy versus size according to $NAE(Q_{10})$, $NAE(Q_{100})$, and $NAE(Q_{1000})$ for the sampling space-saving sets (SSSS), Count-HLL, and SpreadSketch approaches. Note that the accuracy graphs, including FIG. 3, are log-scaled on the y-axis to be able to reasonably present the errors of the other sketches, which are much worse. In the plots in FIG. 3, it can be seen that the sampling space-saving sets approach is superior to the Count-HLL and SpreadSketch approaches. Witty, with the smallest overall number of labels and 88% of its entries coming from the top 1000 labels, is seen to be the easiest data set for all three algorithms. Though even here SSSS with a consistent 0.03 NAE is superior to CountHLL with 0.05-0.12 NAE and SpreadSketch with 0.08-0.13 NAE.

At the other extreme, KASANDR is seen to be the most difficult case as the number of labels is the same magnitude as the number of entries, and only 14% of the entries come from the top 1000 labels. SpreadSketch only starts doing better than the all-zero estimator (which would have an NAE of 1.0) when it has more than 1.0 MiB to work with, and even then only over the top 100 or top 10. Count-HLL also does worse than the all-zero estimator over the top 1000.

While SSSS only needs to hold a single label for each cardinality sketch, Count-HLL and SpreadSketch need to hold w and d·w times as many labels respectively. This leaves less memory for cardinality sketches. Recall that SpreadSketch is run with a redundancy of d=4. Thus, the effective number of cardinality sketches is lower than that of SSSS, and the cardinality sketches used by SpreadSketch only have 64 registers as opposed to the 1024 registers of SSSS.

Overall, it can be seen that SSSS quickly reaches the error inherent in its cardinality sketch, which is low due to the relatively high number of registers. Count-HLL performs well at lower memory sizes where it effectively has fewer than 1000 cardinality sketches yet still manages to have fairly low NAE for the Witty and PubMed data sets. However, for data sets with a lot more labels than its capacity, Count-HLL starts to degrade. For data sets where Spread-Sketch reaches the error inherent in its cardinality sketch, it suffers from the low number of registers in its cardinality sketch. For data sets with more labels than its capacity, SpreadSketch quickly becomes noisy. In the Zipf data set, the set sizes get gradually smaller so that there is not a clear difference between "signal" sets and "noise" sets. It can be seen that the other sketches cannot handle such a setting, and their accuracies are always worse than the all-zero estimator. SSSS has no such problem.

To see how much of SSSS's superior performance is coming from only holding as many labels as counters and thus having more space for both more and larger counters, the testing considered at the performance of the different sketches when they were all set to have the same size (or "width") and the same count distinct sketch size. The table in FIG. 4A shows the performance for the three sketches on the KASANDR data set for s=w=2000 and count distinct sketches of size 1024. In particular, this table shows the accuracy and memory usage for SSSS, Count-HLL, and SpreadSketch when running on the KASANDR data set with the same size settings. Even here it can be seen that SSSS had far superior accuracy while using 4 to 5 times less memory.

The next two tables, shown in FIGS. 4B and 4C, explore how SSSS's behavior changed under different settings. The table in FIG. 4B shows how the size parameter s and accuracy of SSSS varied when holding its memory constant at 3.0 MiB, while varying the size of its underlying count distinct sketch (in this case HLL). In particular, this table shows the effect of varying the underlying count distinct sketch size for SSSS at 3.0 MiB when running on the KASANDR data set. It can be seen that in general it helped to increase the size of the distinct count sketch, but only until the number of counters for SSSS did not drop too low. Thus, in one scenario if the top 1000 are important, it helped to have s be at least 1000.

The table in FIG. 4C shows the difference in accuracy on the KASANDR data set between Algorithm 1 (referenced as SSS in the table), Algorithm 2 (references as RSSS in the table), and Algorithm 3 (referenced as SSSS in the table) for s=2000, showing the relevance of sampling the input.

In addition to having the best accuracy relative to a given memory size, SSSS is also far faster than the other two sketches. The table in FIG. 4D shows the average throughput (number of entries processed per millisecond) achieved by each sketch at 3 MiB. SSSS and Count-HLL are largely comparable, whereas SpreadSketch is the slowest of the three. Note that the throughput numbers for the real data sets include the time for data I/O.

Figure 5:
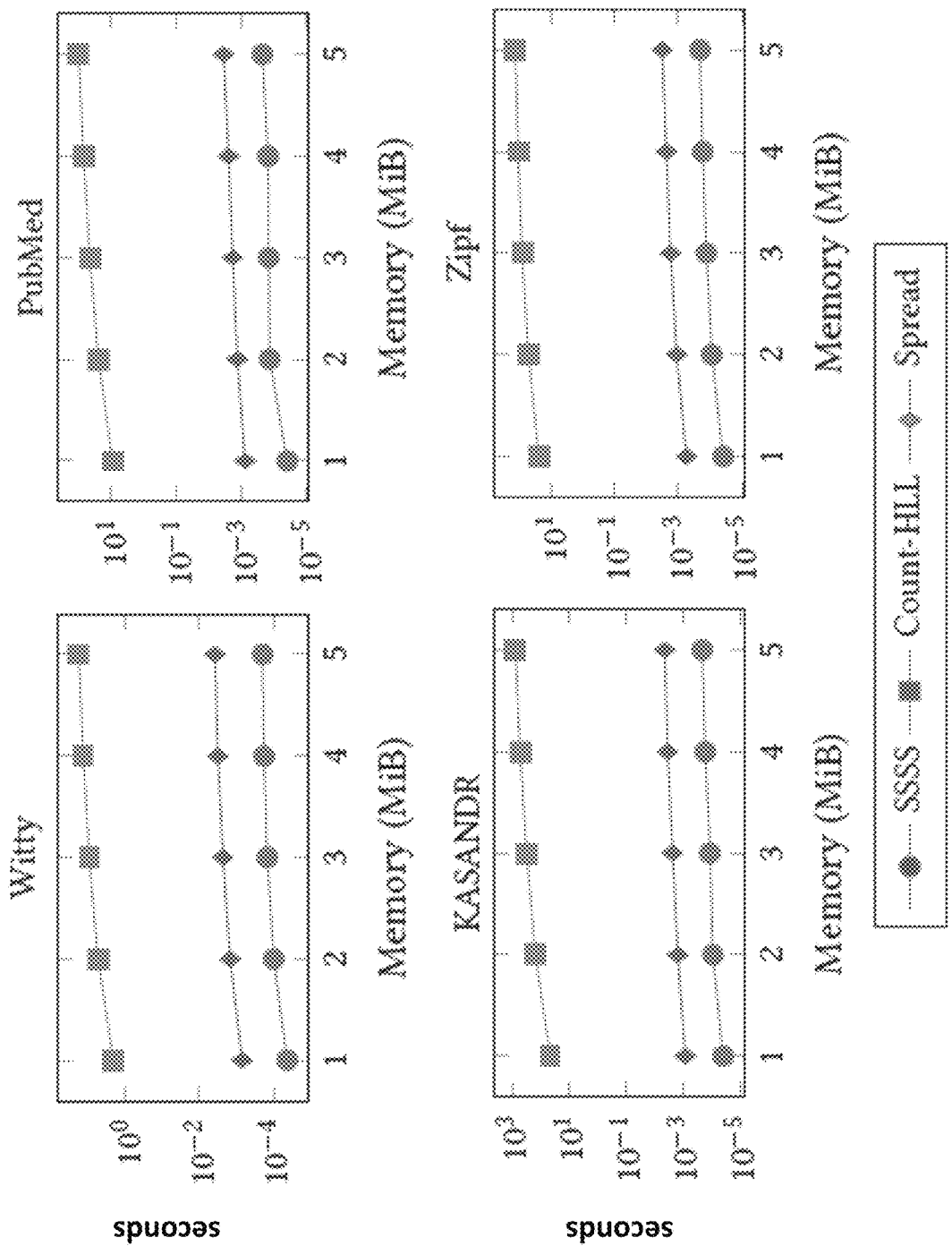
FIG. 5 illustrates plots of test results according to aspects of the technology.

The testing also compared the amount of time it takes a sketch to produce the top 1000 labels along with estimates of the cardinality of their corresponding sets. This is illustrated in the plots of FIG. 5. It is here that the clearest differentiation can be seen. SSSS is an order-of-magnitude faster than SpreadSketch, which in itself is several orders-of-magnitude faster than Count-HLL. SSSS is faster as it keeps what it thinks are the top labels and thus returning a top list is trivial. Both SpreadSketch and Count-HLL have to estimate the cardinalities of all the labels kept by the sketches and then return the top list from there. The cardinality-estimation method of Count-HLL is much slower than that of SpreadSketch as it involves estimating a maximum likelihood.

Figure 6:
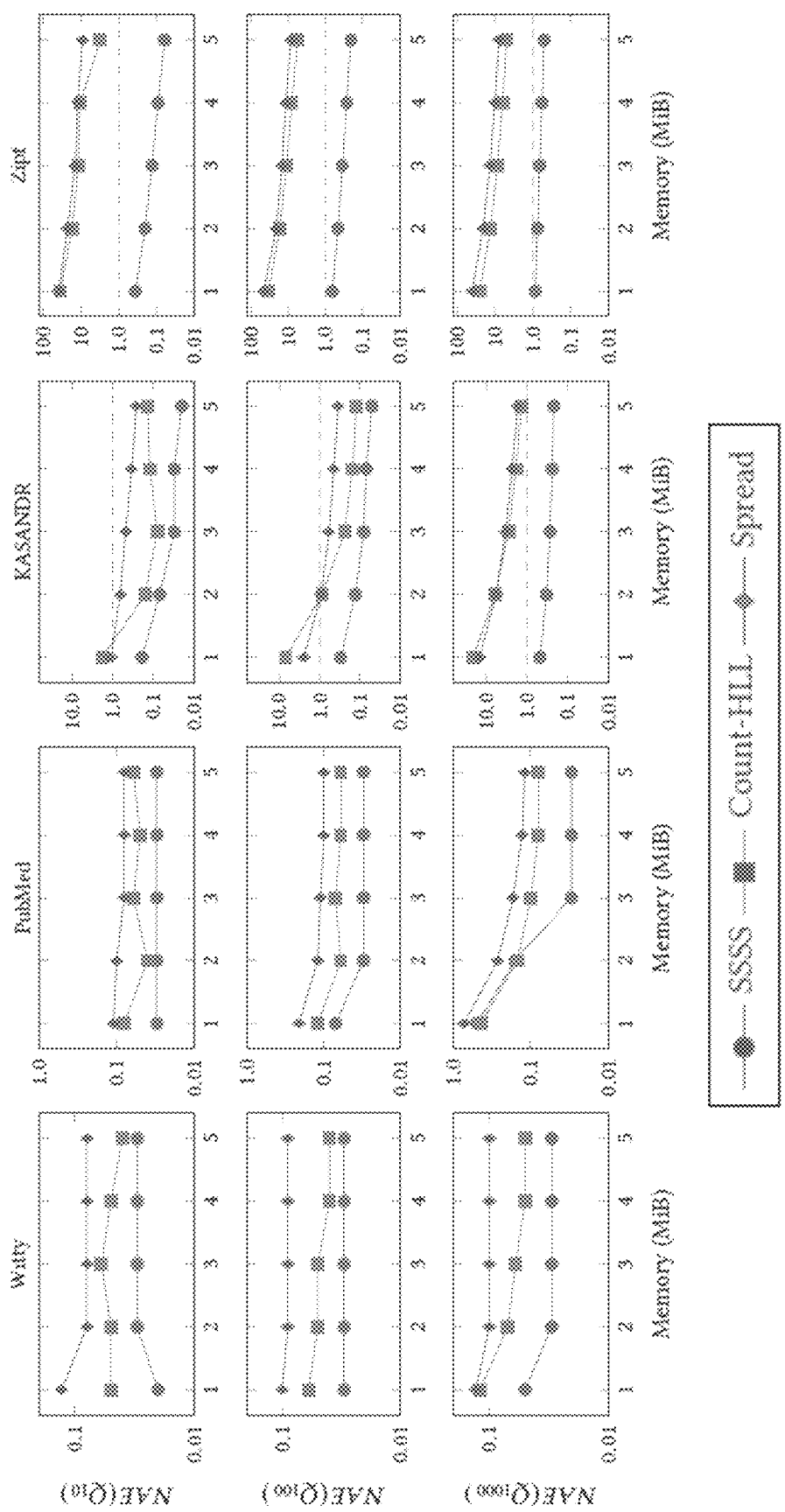
FIG. 6 illustrates plots of test results of accuracy under merging according to aspects of the technology.

FIG. 6 illustrates accuracy under merging, where the testing shows how the different sketches performed when the data was segmented into separate streams (124 for Witty, 484 for PubMed, 159 for KASANDR, and 100 for Zipf), processed in parallel, and merged into a single sketch. All three algorithms have worse accuracy than when processing a single stream, and once again the KASANDR data set caused the most difficulties. Count-HLL and SpreadSketch never achieved $NAE(Q_{1000})<1.0$ even at 5.0 MiB, and performed substantially worse at smaller memory sizes. SSSS is shown to have $NAE(Q_{1000})$ ranging from 0.22 to 0.48, which is less effective than the single stream version, but still an order of magnitude better than the other sketches. The results for merging the synthetic Zipf data streams follow a similar pattern as all the sketches do worse, but only SSSS does better than the all-zero estimator.

Figure 7:
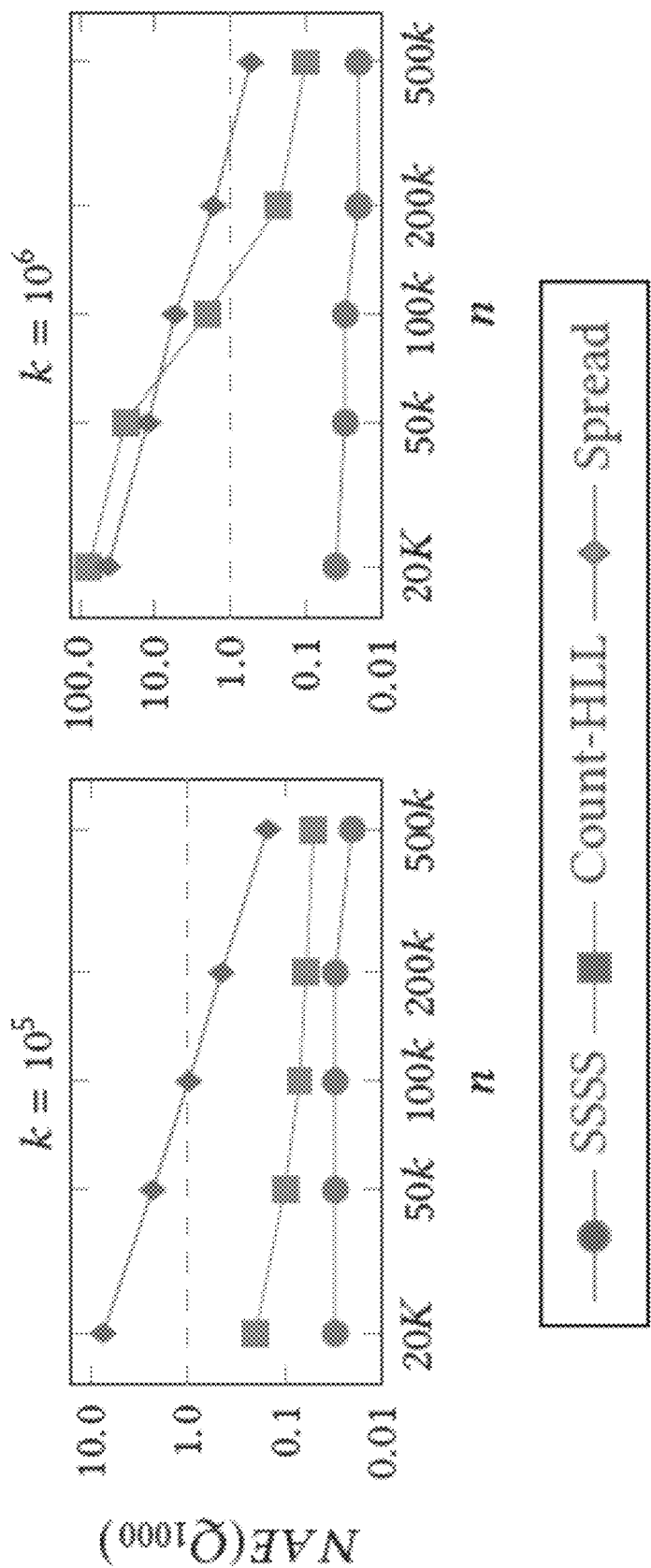
FIG. 7 illustrate performance plots on synthetic overlap data sets according to aspects of the technology.

FIG. 7 show how the different algorithms performed on synthetic overlap data sets. The testing scenario had 1000 heavy sets in which their sizes varied and $10^5$ or $10^6$ small sets of size 1000. The sketches were configured to be of size (or "width") exactly 1000 to match the number of heavy sets. SSSS always performed best and reached the error inherent in its count distinct sketch. When there were $10^6$ small sets Count-HLL performed worse than the all-zero estimator until the heavy sets were 200 times the size of the small sets. Count-HLL performed much better when there were only $10^5$ small sets, but it still performed 2 to 6 times worse than SSSS. SpreadSketch performed worse than the all-zero estimator until the heavy sets were 200 to 500 times the size of the small sets. Note that SSSS achieved its outsize performance using only 1.1 MiB, compared to 5.9 MiB for Count-HLL and 4.3 MiB for SpreadSketch.

Example System Architecture

Figure 8:
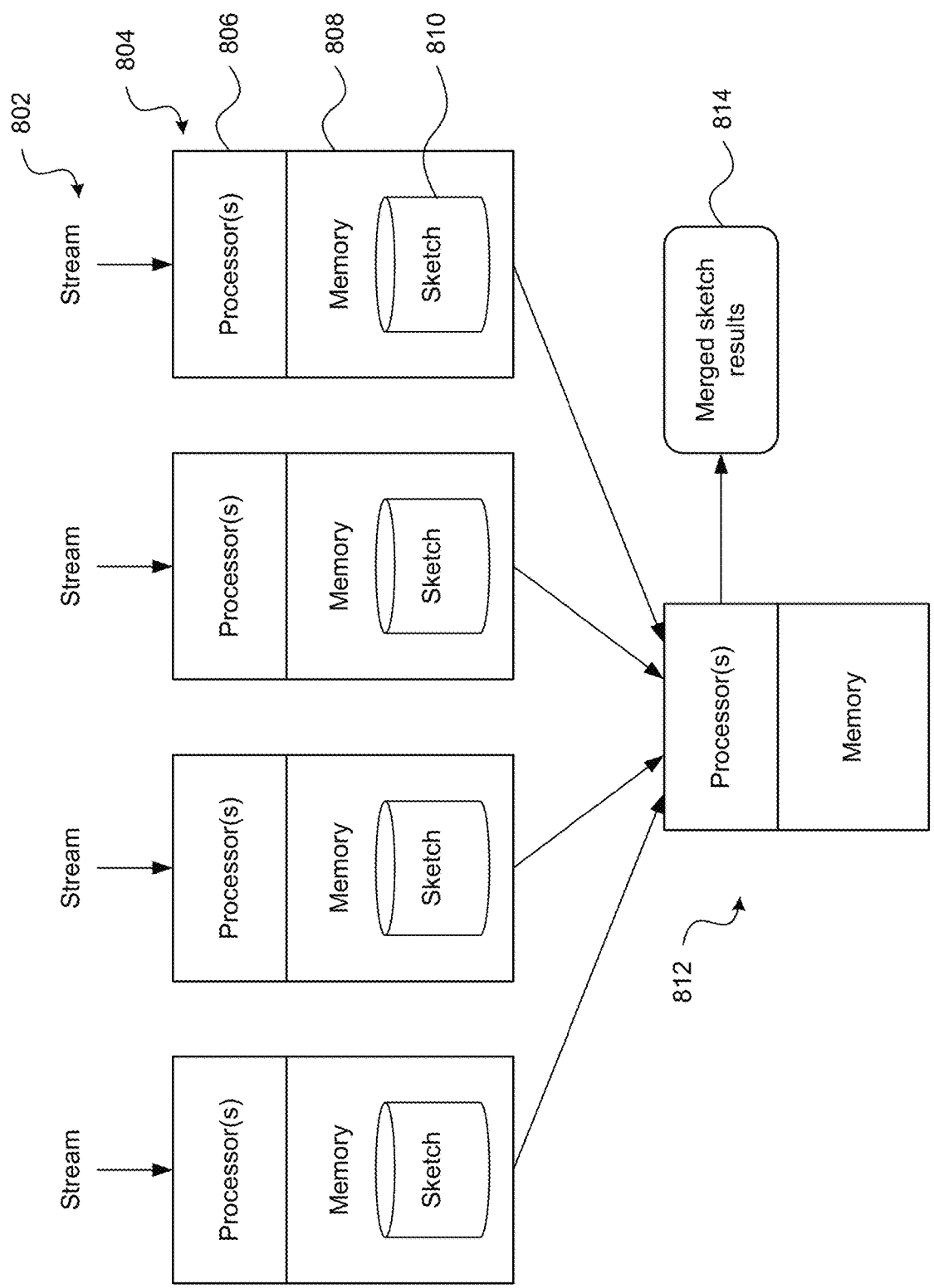
FIG. 8 illustrates an example system in accordance with aspects of the technology.

FIG. 8 illustrates an example system architecture 800, in which a number of streams or other data sets 802 are received by a computing system. In one example, streams 802 may be processed by processing devices 804 that are part of one or more back-end systems (e.g., the same server or different servers in a group). In another example, streams 802 may be processed by processing devices 804 that are part of different client systems (e.g., devices that each have a client agent installed). In either example, the data of streams 802 (e.g., which may be stored in data sets 108) may be stored and processed by processing devices 804 with or without the data being provided or stored by processing device 812.

The streams 802 may be received from client computing devices in response to user interactions (e.g., browsing, clicking, purchasing actions of end user devices such as desktops, laptops, tablets, mobile phones, smartwatches, etc.). While not shown, the client computing devices may include laptops or desktop computers, as well as mobile phones, tablet PCs, smartwatches, head-mounted displays or other wearables, etc. By way of example, the streams may relate to web traffic such as IP address connections, search queries, purchases via a website, etc. As shown, the computing system may include a number of processing devices 804 each with one or more processors 806 and memory 808. The memory 808 associated with the processor(s) 806 of each processing device 804 may be configured to store one or more sketches 810, such as the space-saving set sketches discussed above. The computing system may be, e.g., a single server, a server farm or a cloud-based server system.

The memory 808 stores information accessible by the one or more processors 806, including instructions and data that may be executed or otherwise used by the processor(s). The memory may be of any type capable of storing information accessible by the processor(s), including a computing device-readable medium. The memory is a non-transitory medium such as a hard-drive, memory card, optical disk, solid-state, etc. Systems may include different combinations of the foregoing, whereby different portions of the instructions and data are stored on different types of media.

The instructions may be any set of instructions to be executed directly (such as machine code) or indirectly (such as scripts) by the processor(s) 806. For example, the instructions may be stored as computing device code on the computing device-readable medium. In that regard, the terms "instructions", "modules" and "programs" may be used interchangeably herein. The instructions may be stored in object code format for direct processing by the processor, or in any other computing device language including scripts or collections of independent source code modules that are interpreted on demand or compiled in advance. The instructions may enable the processor(s) to perform any of the algorithms discussed above.

The processors 806 may be any conventional processors, such as commercially available CPUs, TPUs, etc. Alternatively, each processor may be a dedicated device such as an ASIC or other hardware-based processor. Although FIG. 8 illustrates the processors and memory of each processing device 804 as being together, such devices may actually include multiple processors, computing devices, or memories that may or may not be stored within the same physical housing. Similarly, the memory may be a hard drive or other storage media located in a housing different from that of the processor(s), for instance in a cloud computing system. Accordingly, references to a processor or computing device will be understood to include references to a collection of processors or computing devices or memories that may or may not operate in parallel.

Each sketch 810 may be maintained by a given processor 806, in which the data structure of that sketch is updated according to information from the data stream associated with that processor. As shown in FIG. 8, sketch information from each processing device may be provided to another processing device 812, which may be considered a control processing device. This processing device 812 is configured to perform merging of the sketches and generate merged sketch results 814. These results may be stored in memory of the processing device and/or transmitted to one or more customers/clients of the computing system. By way of example, if the merged sketch results 814 indicate that there is a DDOS attack, then that information can be used by the computing system or the customer/client to mitigate the attack. Or if the results indicate that a particular recommendation or ad placement is not effective (or is effective), then the customer/client may perform further actions accordingly, such as changing ranking recommendations or modifying how or which ads are presented to users. In an alternative, the processing device that performs the sketch merging may be one of the processing devices 804.

In one scenario, the sketches are maintained by a back-end computing system that receives the data streams from a host system. The host system may be a website or other customer/client of the back-end system. In some situations, the data streams may be received from multiple host systems. In another scenario, sketching may be performed via an agent of the host system (or systems). Here, because the sketches are compressed representations of the data in the data streams, the host system may transmit the sketches (or each host system may transmit its respective sketch) to the back-end system for merging and/or other processing. In this scenario, the processing devices 804 may be part of or managed by the host system, while the processing device 812 may be part of the back-end system.

The host system and the back-end system may communicate directly or indirectly via a computer network (or multiple networks). The network, and intervening nodes, may include various configurations and protocols including, by way of example only, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

FIG. 9A illustrates an example method 900 in accordance with aspects of the technology. At block 902, the method includes initializing, by one or more processors of a computing system, a set of monotonic distinct count sketches associated with a plurality of distributed data sets. The plurality of distributed data sets each have corresponding labels and corresponding pluralities of distinct items. Each sketch in the set is associated with an accuracy parameter, in which the accuracy parameter indicates an approximation accuracy for that sketch. At block 904 the method includes performing, for each of the plurality of distributed data sets, a query to determine whether a given label associated with that distributed data set is in a corresponding sketch of the set of sketches. As shown at block 906, upon determination that the given label is not in the corresponding sketch, the method includes adding the given label to the corresponding sketch. And as shown at block 908, upon a number of labels in the corresponding sketch exceeding a threshold amount of labels, the method includes identify a label having a smallest count and store the offset value for the corresponding sketch in the memory. A size of the corresponding sketch in the memory is independent of an amount of data in the distributed data set. Then at block 910 the method includes determining a cardinality in the corresponding sketch indicating an approximate number of distinct items in a particular one of the distributed data sets.

FIG. 9B illustrates another example method 920 in accordance with aspects of the technology. At block 922, the method includes initializing, by one or more processors of a computing system, a set of monotonic distinct count sketches associated with a plurality of distributed data sets. The plurality of distributed data sets each have corresponding labels and corresponding pluralities of distinct items. Each sketch in the set is associated with an accuracy parameter, the accuracy parameter indicating an approximation accuracy for that sketch. At block 924, the method includes performing, by the one or more processors for each of the plurality of distributed data sets, a query to determine whether a given label associated with that distributed data set is in a corresponding sketch of the set of sketches. Here, at block 926, when the given label is in the corresponding sketch, the method includes inserting the distinct item associated with the given label into the corresponding sketch. Block 928 involves when the given label is not in the corresponding sketch. Here, at block 930, when a number of labels in the corresponding sketch is less than a specified size, the method includes adding the given label along with a new sketch, and inserting the distinct item associated with the given label into the new sketch. And at block 932, when the number of labels in the corresponding sketch is greater than or equal to the specified size, the method includes adding the given label and assign it to a selected one of the set of sketches associated with a minimum label size, and inserting the distinct item associated with the given label into the selected sketch.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

Moreover, unless expressly stated otherwise, the foregoing examples and arrangements are not mutually exclusive and may be implemented in various ways to achieve unique advantages. By way of example only, the merging approach for multiple sketches may be utilized with any of the other algorithms discussed herein. These and other variations and combinations of the features discussed herein can be employed without departing from the subject matter defined by the claims. In view of this, the foregoing description of exemplary embodiments should be taken by way of illustration rather than by way of limitation.

The examples described herein, as well as clauses phrased as "such as," "including" and the like, should not be interpreted as limiting the subject matter of the claims to any specific examples. Rather, such examples are intended to illustrate possible embodiments. Further, the same reference numbers in different drawings can identify the same or similar elements. The processes or other operations may be performed in a different order or concurrently, unless expressly indicated otherwise herein.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. As used in this document, "each" refers to each member of a set or each member of a subset of a set.

The invention claimed is:

1. A computing system, comprising:
   memory configured to store a set of monotonic distinct count sketches associated with a plurality of distributed data sets, the plurality of distributed data sets having corresponding labels and corresponding pluralities of distinct items; and
   one or more processors operatively coupled to the memory, the one or more processors being configured to:
   initialize the set of sketches, each sketch in the set being associated with an accuracy parameter, the accuracy parameter indicating an approximation accuracy for that sketch, wherein an offset value is maintained for each sketch;
   perform, for each of the plurality of distributed data sets, a query to determine whether a given label associated with that distributed data set is in a corresponding sketch of the set of sketches, wherein:
      upon determination that the given label is not in the corresponding sketch, add the given label to the corresponding sketch; and
      upon a number of labels in the corresponding sketch exceeding a threshold amount of labels, identify a label having a smallest count and store the offset value for the corresponding sketch in the memory, wherein a size of the corresponding sketch in the memory is independent of an amount of data in the distributed data set; and
   determine a cardinality in the corresponding sketch indicating an approximate number of distinct items in a particular one of the distributed data sets.

2. The computing system of claim 1, wherein each sketch in the set is associated with a failure parameter that indicates a failure probability for that sketch.

3. The computing system of claim 1, wherein the computing system is configured to receive the distributed data sets from one or more source computing devices.

4. The computing system of claim 1, wherein the plurality of distributed data sets is a plurality of distributed data streams.

5. The computing system of claim 1, wherein the one or more processors are further configured to remove the label having the smallest count.

6. The computing system of claim 1, wherein the one or more processors are further configured to merge the set of sketches into a merged sketch, and to determine a set of the number of distinct items in the merged sketch having a selected property.

7. The computing system of claim 6, wherein the merge is performed multiple times at a set interval of time.

8. The computing system of claim 1, wherein a memory footprint of each sketch is independent of an amount of data represented by that sketch.

9. The computing system of claim 1, wherein a first portion of the memory stores the monotonic distinct count sketches, and a second portion of the memory stores the offset value for each sketch.

10. The computing system of claim 1, wherein the one or more processors comprises a set of processors, and each sketch in the set is associated with a respective one of the set of processors.

11. The computing system of claim 1, wherein the computing system is configured to perform a network security evaluation according to the cardinality.

12. The computing system of claim 11, wherein the network security evaluation identifies one or more source IP addresses that exceed a selected number of distinct connections with destination IP addresses within a determined amount of time.

13. The computing system of claim 1, wherein the one or more processors are further configured to perform a hash operation to determine whether to either remove a particular label from the corresponding sketch or not add the particular label to the corresponding sketch.

14. The computing system of claim 1, wherein the one or more processors include:
a group of processors each assigned to one of the sketches in the set; and
another processor in operative communication with the group of processors;
wherein:
each processor in the group is configured to transmit its corresponding sketch to the other processor; and
the other processor is configured to merge the transmitted sketches together to generate a merged sketch.

15. The computing system of claim 14, wherein the other processor is further configured to perform a network security evaluation according to a cardinality of the merged sketch.

16. A computing system, comprising:
memory configured to store a set of monotonic distinct count sketches associated with a plurality of distributed data sets, the plurality of distributed data sets having corresponding labels and corresponding pluralities of distinct items; and
one or more processors operatively coupled to the memory, the one or more processors being configured to:
initialize the set of sketches, each sketch in the set being associated with an accuracy parameter, the accuracy parameter indicating an approximation accuracy for that sketch; and
perform, for each of the plurality of distributed data sets, a query to determine whether a given label associated with that distributed data set is in a corresponding sketch of the set of sketches, wherein:
when the given label is in the corresponding sketch, then insert the distinct item associated with the given label into the corresponding sketch; and
when the given label is not in the corresponding sketch, then:
when a number of labels in the corresponding sketch is less than a specified size, add the given label along with a new sketch, and insert the distinct item associated with the given label into the new sketch; and
when the number of labels in the corresponding sketch is greater than or equal to the specified size, add the given label and assign it to a selected one of the set of sketches associated with a minimum label size, and insert the distinct item associated with the given label into the selected sketch.

17. The system of claim 16, wherein upon sampling, the one or more processors are further configured to perform a hashing operation on the distinct item associated with the given label.

18. The system of claim 17, wherein the hashing operation evaluates whether an inverse value of a hash of the distinct item is greater than a determined variable.

19. The system of claim 18, wherein in response to evaluation that the inverse value of the hash of the distinct item is greater than the determined variable, the one or more processors are configured to calculate a size of a minimum in the selected sketch, and to set the determined variable to the size of the minimum in the selected sketch.

20. The system of claim 19, wherein the one or more processors are configured to add the given label and assign it to the selected sketch, and insert the distinct item associated with the given label into the selected sketch, when the inverse value of the hash of the distinct item is greater than the specified size.

21. The system of claim 16, wherein an offset value is maintained for each sketch in the set of sketches, and the offset values are stored in the memory.

22. A method, comprising:
initializing, by one or more processors of a computing system, a set of monotonic distinct count sketches associated with a plurality of distributed data sets, the plurality of distributed data sets having corresponding labels and corresponding pluralities of distinct items, in which each sketch in the set is associated with an accuracy parameter, the accuracy parameter indicating an approximation accuracy for that sketch;
performing, by the one or more processors for each of the plurality of distributed data sets, a query to determine whether a given label associated with that distributed data set is in a corresponding sketch of the set of sketches, wherein:
when the given label is in the corresponding sketch, inserting the distinct item associated with the given label into the corresponding sketch; and
when the given label is not in the corresponding sketch, then:
when a number of labels in the corresponding sketch is less than a specified size, adding the given label along with a new sketch, and inserting the distinct item associated with the given label into the new sketch; and
when the number of labels in the corresponding sketch is greater than or equal to the specified size, adding the given label and assign it to a selected one of the set of sketches associated with a minimum label size, and inserting the distinct item associated with the given label into the selected sketch.

23. A non-transitory computer readable recording medium having instructions stored thereon, the instructions, when executed by one or more processors, implementing a method comprising:
initializing a set of monotonic distinct count sketches associated with a plurality of distributed data sets, the plurality of distributed data sets having corresponding labels and corresponding pluralities of distinct items, in which each sketch in the set is associated with an accuracy parameter, the accuracy parameter indicating an approximation accuracy for that sketch;

performing, for each of the plurality of distributed data sets, a query to determine whether a given label associated with that distributed data set is in a corresponding sketch of the set of sketches, wherein:

when the given label is in the corresponding sketch, inserting the distinct item associated with the given label into the corresponding sketch; and when the given label is not in the corresponding sketch, then:

when a number of labels in the corresponding sketch is less than a specified size, adding the given label along with a new sketch, and inserting the distinct item associated with the given label into the new sketch; and when the number of labels in the corresponding sketch is greater than or equal to the specified size, adding the given label and assign it to a selected one of the set of sketches associated with a minimum label size, and inserting the distinct item associated with the given label into the selected sketch.

\* \* \* \* \*